(No Model.) 2 Sheets—Sheet 2.

H. H. SPORTON & E. WHITE.
ROTARY FLUID METER.

No. 449,009. Patented Mar. 24, 1891.

Witnesses.
G. F. Redfern
John E. Bousfield.

Inventors.
Henry H. Sporton
Ernest White

UNITED STATES PATENT OFFICE.

HENRY HERBERT SPORTON AND ERNEST WHITE, OF ENFIELD, ENGLAND.

ROTARY FLUID-METER.

SPECIFICATION forming part of Letters Patent No. 449,009, dated March 24, 1891.

Application filed February 12, 1890. Serial No. 340,109. (No model.)

*To all whom it may concern:*

Be it known that we, HENRY HERBERT SPORTON and ERNEST WHITE, subjects of the Queen of Great Britain, residing at Enfield, England, have invented new and useful Improvements in Fluid-Meters, of which the following is a specification.

Our invention relates to fluid-meters of the kind described in the specification of British Letters Patent No. 13,395 of 1885, and in which the water or other fluid is caused to pass through a series of openings in such a manner as to impinge against the vanes of a fan arranged adjacent to the said openings and to rotate the same, the motion of which fan is utilized for operating the registering mechanism. The defect of such meters as hitherto constructed is that when only a small quantity of fluid is passing through them the streams or jets of fluid issuing from the said openings do not impinge with sufficient force against the vanes of the fan to cause the rotation of the same.

According to our present invention we arrange a second series of openings adjacent to the first series, but of much smaller area, and in connection with the first series of holes of large area we arrange a valve, which, when more than a given volume of fluid is flowing through the meter in a given time, is adapted to be raised by the pressure of the fluid itself, thereby allowing the fluid to issue through the series of large openings to rotate the fan. When, however, the flow of fluid is below a given quantity in a given time it has not sufficient pressure to lift the said valve, it then passes only through the series of small openings, but at sufficient velocity to rotate the fan. The plate in which the two series of holes are formed is advantageously made removable, and has formed integral with it the toe-piece or step, upon which the fan rotates.

To enable our invention to be fully understood, we will describe the same with reference to the accompanying drawings, in which—

Figure 1:
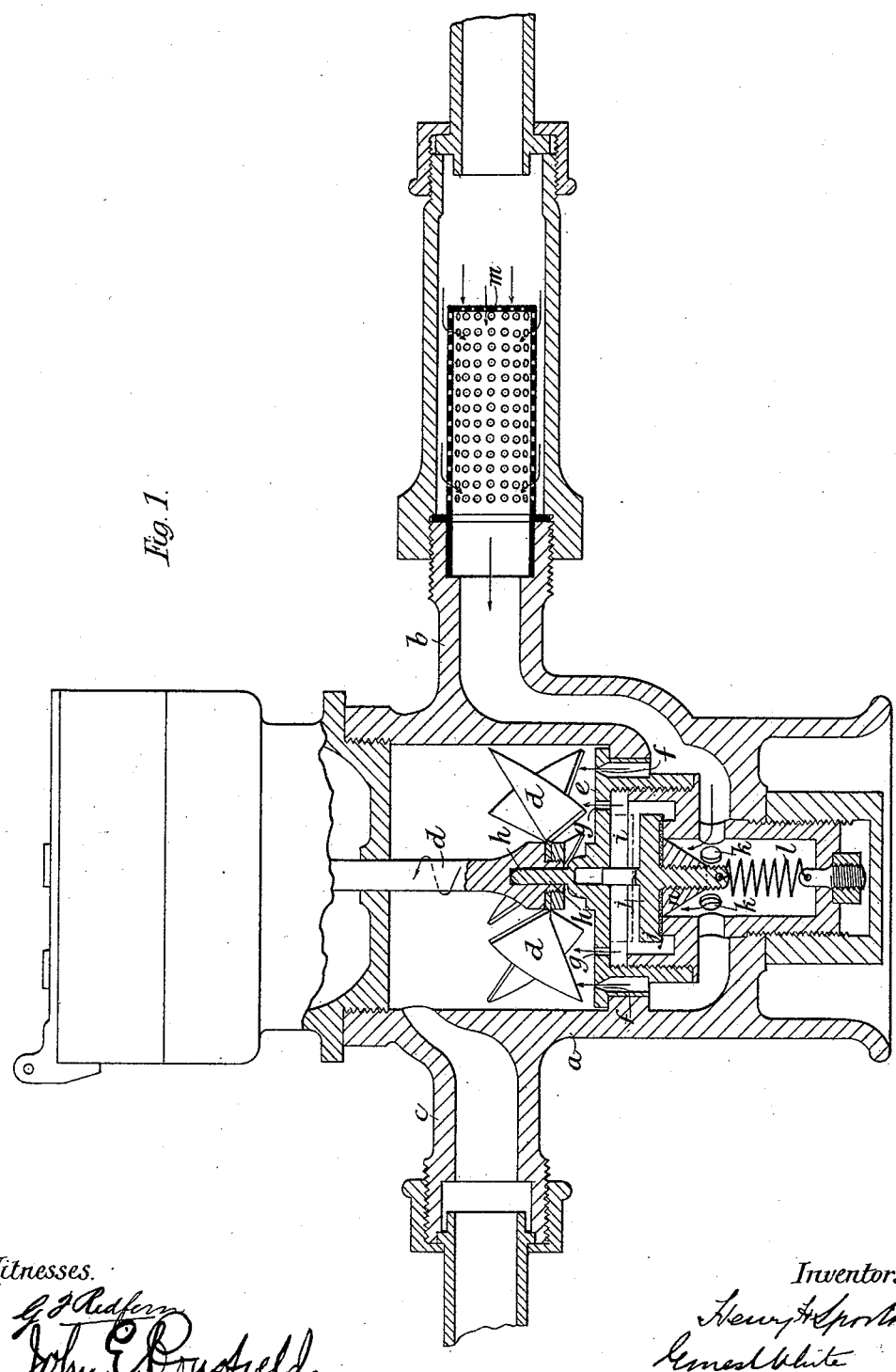
Figure 2:
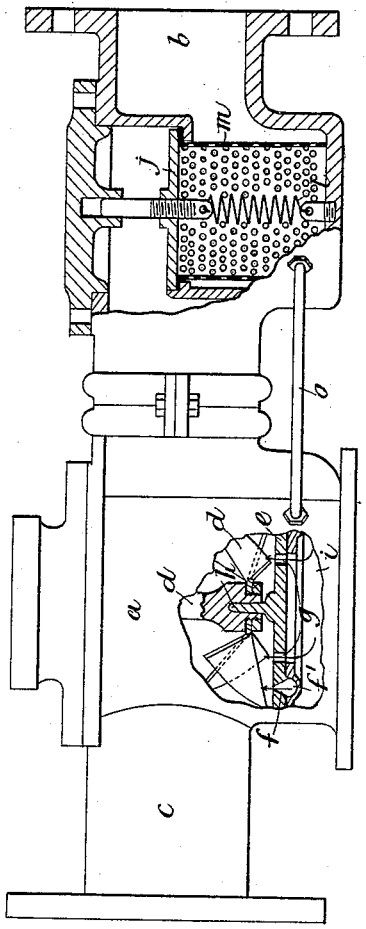

Figure 1 is a sectional elevation of a meter embodying our improvements, and Fig. 2 is a similar view, illustrating the application of our invention to a meter of larger capacity than that shown in Fig. 1.

Similar letters of reference indicate corresponding parts in both the figures.

$a$ is the casing of the apparatus, which is provided with the inlet $b$ and outlet $c$.

$d$ is the fan, and $e$ is the plate, containing the series of small openings $f$ and the series of large openings $g$, the said plate being made removable and provided with the toe-piece $h$, upon which the fan is supported at its lower end. It will be noticed that the openings $f$ are constantly in communication with the fluid-inlet, so that the fluid can at all times pass through them, while the openings $g$ communicate with a chamber $i$, the inlet to which is normally closed by a valve $j$. When, however, a large quantity of water or other fluid is passing, the valve $j$ is lifted by the pressure, the fluid entering through the inlet-passage and through the orifices $k\ k$ beneath the valve-seat in the direction of the arrows.

$l$ is a spring for normally retaining the valve upon its seat, and $n$ is a cone screwed onto the stem of the said valve and serving to prevent the latter from becoming displaced upon its seat. With this construction it will be understood that when a large quantity of fluid is passing through the meter, not only does such fluid issue through the openings $f$, but also through the openings $g$, the valve $j$ being lifted by the pressure. When, however, only a small quantity of fluid is passing, the pressure is not sufficient to raise the valve, so that the flow through the openings $g$ is stopped, only the openings $f$ serving for the flow of fluid.

As shown in the drawings, the series of openings $f$ is placed farther from the center of the fan than the series of openings $g$, the object of this arrangement being to allow the water to act upon the fan with greater leverage than it would if the said openings $f$ were nearer to the center of the said fan.

$m$ is a filter or strainer for preventing any solid matter from entering the meter.

In the modification of our invention, shown in Fig. 2 the valve $j$, instead of being arranged beneath the plate $e$, as hereinbefore described, is placed in a suitable chamber adjacent to the meter, and the series of openings $f$ communicate with a channel $f'$, connected with the fluid-supply through the pipe $o$, so that the fluid can pass at all times. When a large quantity of fluid is passing, the valve $j$ is raised, as hereinbefore described, whereby the fluid can enter the chamber $i$, beneath the plate $e$, and thence flow through the openings $g$. In this modification the filter $m$ is shown as being arranged immediately beneath the valve $j$ and supported by a flange, which serves as a valve-seat.

Having now particularly described and ascertained the nature of the said invention, and in what manner the same is to be performed, we declare that what we claim is—

1. In a fluid-meter, the combination, with a fan, of a part provided with a separate series of large and small openings, each series having a different radial position in respect to said fan, and automatic means for controlling the series of larger openings, substantially as described.

2. In a fluid-meter, the combination, with a fan, of a part provided with a separate series of large and small openings, said series of large openings being located nearer the axis of the fan, and an automatic valve controlling the said series of larger openings, substantially as described.

3. The combination, with the registering devices of an actuating-fan therefor, of a plate having a separate series of large and small openings discharging against said fan, the series of larger openings being located nearer the axis of the fan than the series of smaller openings, and an automatic valve controlling said series of larger openings, substantially as described.

HENRY HERBERT SPORTON.
   ERNEST WHITE.

Witnesses:
 G. F. REDFERN,
 JOHN E. BOUSFIELD,
*Of the firm of G. F. Redfern & Co., 4 South Street, Finsbury, London, Patent Agents.*